United States Patent [19]

Inoue et al.

[11] Patent Number: 4,643,911
[45] Date of Patent: Feb. 17, 1987

[54] METHOD FOR FORMING LIGHT-SHIELD COAT ON LENSES

[75] Inventors: Takao Inoue; Takahiro Matsuo, both of Hirakata; Youichi Nakamura, Katano, all of Japan

[73] Assignee: Matsushita Electric Ind. Co., Ltd., Osaka, Japan

[21] Appl. No.: 654,669

[22] Filed: Sep. 26, 1984

[30] Foreign Application Priority Data

Sep. 30, 1983 [JP] Japan .................. 58-183356

[51] Int. Cl.4 ............................................. B05D 3/06
[52] U.S. Cl. ............................... 427/54.1; 427/162; 427/368
[58] Field of Search ............... 427/44, 54.1, 162, 163, 427/429, 425, 368; 118/409, 258, 320, 110, 107; 350/276 R, 276 SL

[56] References Cited

U.S. PATENT DOCUMENTS

| | | | |
|---|---|---|---|
| 2,270,177 | 1/1942 | Vawryk | 118/409 |
| 2,312,206 | 2/1943 | Calbick | 350/276 |
| 2,346,810 | 4/1944 | Young | 350/276 |
| 2,760,550 | 8/1956 | Kimes | 118/107 |
| 3,258,521 | 6/1966 | Francel et al. | 427/425 |
| 3,767,457 | 10/1973 | Hubbard et al. | 427/54.1 |
| 4,197,333 | 4/1980 | Leach et al. | 427/425 |

FOREIGN PATENT DOCUMENTS 185906 9/1922 United Kingdom ............... 118/107

Primary Examiner—John H. Newsome
Attorney, Agent, or Firm—Wenderoth, Lind & Ponack

[57] ABSTRACT

A method for the formation of a light-shield coat on a peripheral area of an optical lens other than the effective aperture area, which method is constituted by the steps of mounting the lens on a rotatable lens support means effective to rotate the lens about the optical axis thereof with the peripheral area positioned exteriorly of the lens support means, applying to the peripheral area of the lens a photo-setting, black-colored light shielding paint capable of hardening when exposed to ultraviolet rays to form the light-shield coat on the peripheral area of the lens, and radiating ultraviolet rays onto the peripheral area of the lens, while the latter is rotated, to cause the light-shield coat to harden.

6 Claims, 8 Drawing Figures

METHOD FOR FORMING LIGHT-SHIELD COAT ON LENSES

BACKGROUND OF THE INVENTION

The present invention relates to a method for applying a light shielding paint to a peripheral area of a lens, particularly a plastic lens, such as used in an optical system of binoculars, cameras, video projectors or television receiver sets, to form a light-shield coat thereon.

Hitherto, two types of light shielding paint for application to lenses have been available: One is a light shielding paint of a type containing an volatile solvent and the other is a two-component paint capable of hardening at room temperature. The application of any one of these light shielding paints requires manual intervention and skill.

More specifically, not only does it often occur that particles of the light shielding paint tend to stain an effective aperture area of a lens, but also the application of the paint is carried out in two separate steps to prevent the effective aperture area of the lens from being touched. (The term "effective aperture area" used in the specification and claims is to be understood as meaning a central area of the lens practically utilized for the passage of rays of light of interest therethrough in a direction parallel to the optical axis of such lens, in contrast to the peripheral area which is utilized for the support thereof on a lens mount or barrel.) Moreover, once the paint has been applied, the drying takes overnight, or several hours at least, constituting one of the major causes of the increased manufacturing cost of lenses coated on the peripheral area with the light shielding paint.

The above discussed problem may be negligible if the production of such lenses remains limited. However, when it comes to a projection type television receiver set, the production of lenses having a relatively large size is desired and, therefore, improvement of the productivity has come about by the use of an injection molding technique, the minimization of the weight and the minimization of the manufacturing cost. Thus, with the increased production of the lenses, a demand has arisen for a light shielding paint capable of hardening quickly.

Since the conventional method for forming a light-shield coat on the peripheral area of a lens is performed by a skilled worker using a brush and a black-colored paint, not only does the thickness of the resultant coat vary from one lens to another, but also a single lens tends to have a varying thickness of the coat. This is a problem in that the coated lens as a whole fails to meet the design requirements to such an extent that, when it is fitted in a lens mount, barrel or any other lens support, it tends to lack stability. Moreover, with the conventional method, the application of the black-colored paint has to be performed so as to form a light-shield coat to a thickness selected in consideration of the possible damage the coat may be subjected to when the coated lens is mounted on the lens mount, barrel or any other lens support. The conventional method has a problem as regards the minimization of the lens manufacturing cost and the uniformity in quality of the lenses.

Furthermore, on the one hand, while the production is increasing, the number of skilled workers competent to apply the paint to the peripheral area of each lens is limited, and on the other hand, no method for the formation of a coat of uniform thickness has yet been established and, therefore, the production tact time cannot be improved at all.

When it comes to conventional coating apparatuses, some employ a spray system and some employ a transfer system using rolls. In the spray system, the paint used is of a type containing a volatile solvent and it has numerous disadvantages in that it is difficult to keep the viscosity of the paint at a predetermined value throughout the coating operation because of the hardening of the material thereof, clogging of the paint tends to readily occur in a spray nozzle, spray of the paint often stains the apparatus, and solvent gases are susceptible to explosion unless the utmost care is taken in the environment in which the coating operation is performed. As regards the transfer system, not only is it difficult to apply the paint simultaneously to two faces of the angled peripheral area of the lens, but also the transfer roll or rolls are susceptible to wear so as to reduce their life time, particularly when the peripheral area of each lens has a plurality of projections such as gates of a few millimeters in length.

When it comes to a screen printing technique, it cannot be applied, without considerable difficulty, in coating a curved surface having indentations and, moreover, some limitations are imposed on both the hardening and drying time of the paint attributable to the reduced production tact time. Apart from the above, so far as the paint of a type capable of hardening when exposed to ultraviolet rays, i.e., a photo-setting paint, is concerned, it can result in a film or coat of a thickness not greater than 30 micrometers and must be repeatedly applied at least two times to form a double-layered coat in order for the lens to have a light-shielding property. However, it often happens that the first and second layers forming the double-layered coat separate from each other.

SUMMARY OF THE INVENTION

The present invention has for its essential object to provide an improved method for forming a light-shield coat on the peripheral area of a lens with the use of a photo-setting, black-colored light shielding paint capable of hardening when exposed to ultraviolet rays, which method is effective to secure a high productivity and also to result in the efficient formation of the light-shield coat.

Another important object of the present invention is to provide an improved method of the type referred to above which is effective to form the light-shield coat of uniform thickness in a minimized time.

In order to accomplish these objects, the present invention provides a method for the formation of a light-shield coat on a peripheral area of an optical lens other than the effective aperture area, which method comprises the steps of mounting the lens on a rotatable lens support means effective to rotate the lens about the optical axis thereof with the peripheral area positioned exteriorly of the lens support means, applying to the peripheral area of the lens a photo-setting, black-colored light shilding paint capable of hardening when exposed to ultraviolet rays (which paint is hereinafter referred to as "UV-setting masking paint") to form the light-shield coat on the peripheral area of the lens, and radiating ultraviolet rays onto the peripheral area of the lens, while the latter is rotated, to cause the light-shield coat to harden.

Specifically, the application of the paint having a light shielding property to the peripheral area of the lens is preferably carried out by the use of at least one rotary brush of generally roll-shaped configuration effective to apply the UV-setting masking paint while being rotated about the longitudinal axis thereof. At this time, the lens is also rotated together with the lens support means with the peripheral area contacting the bristles of the brush being rotated.

However, the thickness of the light-shield coat formed with the use of the UV-setting masking paint is limited in view of the fact that the UV-setting masking paint has a property of shielding light and, therefore, the penetration of ultraviolet rays required to harden the paint is limited. Conversely, the resultant coat will fail to exhibit a light shielding property if the paint is applied in a relatively small thickness, although ultraviolet rays can readily penetrate such a small thickness for accelerating the hardening of the paint so applied. Therefore, the UV-setting masking paint is required to be applied at least two times to form overlapping plies of the paint on the peripheral area of the lens, in order for the resultant coat to exhibit the satisfactory light shielding property.

It is to be noted that, unless the applied paint is sufficiently hardened, pin holes tend to be formed in the resultant coat by reason of heat shock, spattering of unhardened components of the applied paint, and/or hydrolysis of unhardened components of the applied paint, with the result in that the resultant coat may be readily peeled off from the lens. In particular, where the UV-setting masking paint is utilized and applied at least two times to ultimately form the double layered structure of the light-shield coat, if the first ply of the applied paint is hardened prior to the second ply of the same paint being formed, an active functional group disappears from the surface of the first paint ply and the subsequently formed second paint ply will not bond satisfactorily to the first paint ply, constituting a cause of ply separation. When the second ply of the paint is applied before the first ply of the paint is hardened, the interlayer bonding strength can be increased. However, considering that the lens used in practice is more or less heated by light falling thereon, the heat evolved by the lens may cause the unhardened paint to generate vapor which in turn mists the effective aperture area of the lens and/or causes cracking to occur at the peripheral area of the lens. Accordingly, the UV-setting masking paint must be completely hardened.

In view of the foregoing, it is preferred to use at least two, generally roll-shaped brushes one for each of the first and second plies of the applied UV-setting masking paint. Preferably, the first brush used in the formation of the first paint ply has short or hard bristles so that, for the purpose of increasing the interlayer bonding strength even though the second paint ply is formed over the first paint layer subsequent to the complete hardening of the latter, the outer surface of the first paint ply formed on the peripheral area of the lens will have a plurality of circumferentially extending line indentations by which the area of the surface of contact of the first paint ply with the second paint ply can be increased.

The second brush used in the formation of the second paint ply may have bristles identical with those of the first brush, but is preferred to have longer or harder bristles than those of the first brush for the purpose of minimizing the formation of the circumferentially extending line indentations on the outer surface of the resultant paint ply remote from the first paint ply. Where the second brush has bristles identical with those of the first brush, the circumferentially extending line indentations cannot be minimized although the second paint ply can be formed over the first paint ply.

The UV-setting masking paint is utilizeable for coating when the viscosity thereof is not lower than 20 poises at 25° C. If the viscosity of the paint is lower than 20 poises, the paint flows sufficiently easily that it may smear the effective aperture area of the lens during the coating operation. On the other hand, if the viscosity of the paint is higher than 200 poises, the paint tends to lack a wettability to such an extent that the paint applied is spattered outwardly by the rotation of the brush rather than adhering to the peripheral area of the lens resulting in contamination of both the lens and the apparatus. Therefore, in the practice of the method of the present invention, the viscosity of the UV-setting masking paint is preferred to be within the range of 20 to 200 poises. More specifically, if the UV-setting masking paint used to form the second paint ply has a viscosity equal to or lower than the viscosity of the UV-setting masking paint used to form the first paint ply, both the wettability and the levelling of the paint are improved and the circumferentially extending line indentations formed in the second paint ply will become smaller than those in the first paint layer.

The bristles of the brush utilizeable in the practice of the method of the present invention may be made of nylon fibers, wools, pig hairs, horse hairs, cat hairs or any other fibrous material known as a material for brushes.

In order to impart a multiple of generally circumferentially extending line indentations to the surface of the first paint ply, numerous alternatives are possible. One of them is to employ harder bristles for the first brush than for the second brush, or to employ shorter and/or more bold bristles for the first brush than for the second brush where the bristles of the first and second brushes are made of the same material. However, in terms of the minimization of the spattering of the UV-setting masking paint and the increased life time of the brushes, it is preferable that, if wool is used as a material for the bristles of each of the first and second brushes, the bristles of the second brush are longer than those of the first brush so that a final light-shield coat of uniform thickness with the minimized line indentations on the surface will be obtained.

With respect to the direction of rotation of the lens support means and, hence, the lens supported thereby, and that of the brushes, if these directions are the same, the formation of the indentations on the surface can be minimized because of the enhanced relative rubbing action taking place therebetween. However, the presence of projections, such as, for example, gates integral with the plastic lens manufactured by the use of a plastics molding technique, which projections are as great as 2 mm in length, makes it difficult to apply the paint to such portions of the peripheral area of the lens where the projections are present. Accordingly, in order to avoid the possibility that some or all of that portions of the peripheral area of the lens may remain uncoated, it is preferred to temporarily reverse the direction of rotation of the lens.

In the practice of the method of the present invention, the lens support means preferably comprises rotatably supported, coaxially aligned cylindrical hollow chucks so designed and so positioned as to sandwich the lens therebetween. Preferably, each of the lens chucks has an outer diameter smaller by at least 3 mm than the diameter of the lens so that, when the lens is sandwiched therebetween, the confronting ends of the respective lens chucks can be positioned at least 3 mm radially inwardly from the perimeter of the lens. The lens support means may also comprise a cylindrical hood for each of the chucks made of a synthetic resin having a low surface energy, which hood is fixedly supported so as to enclose the respective chuck for masking the respective chuck. Preferably, the synthetic resin having a low surface energy, which is the material for each hood, is selected from the group consisting of Teflon, polyethylene and polypropylene. In addition, the annular face of each of the confronting clamping ends of the respective lens chucks is preferably covered with an annular rubber pad for avoiding any possible formation of scratches on the lens surface.

BRIEF DESCRIPTION OF THE DRAWINGS

These and other objects and features of the present invention will readily be understood from the following description of a preferred embodiment together with the accompanying drawings.

DETAILED DESCRIPTION OF THE EMBODIMENT

Figure 1:
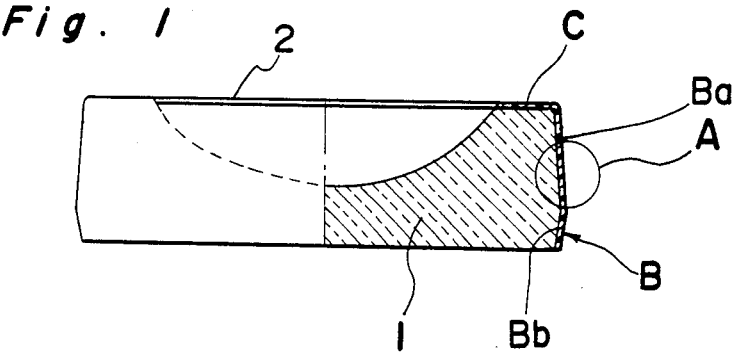
FIG. 1 is a side view of a lens with one of the halves shown in section.
Figure 2:
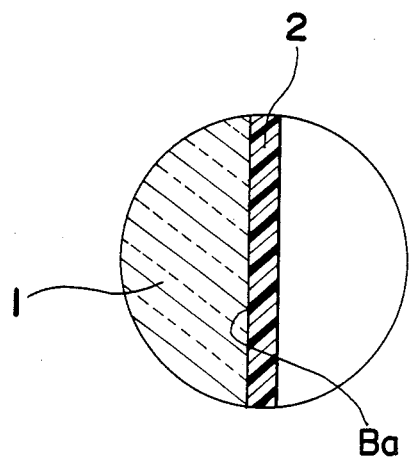
FIG. 2 is a fragmentary sectional view, on an enlarged scale, showing the details of a portion of the peripheral area of the lens enclosed by the circle A in FIG. 1.

Before the description of the present invention proceeds, it is to be noted that like parts are designated by like reference numerals throughout the accompanying drawings.

In the practice of the coating method according to the present invention, the coating is placed on an optical lens, shown by 1 in FIG. 1, 124 mm in diameter made of acrylic resin by the use of an injection molding technique. As shown in FIG. 1, the lens 1 is a plano-concave diverging lens having its periphery delimited by a slightly outwardly beveled peripheral surface B, and also having an annular marginal surface C coaxial with the optical axis of the lens 1 and radially inwardly extending from the concave surface of the lens. It is both the beveled peripheral surface B and the annular marginal surface C that are desired to be coated with the light-shield coat. The term "peripheral area" used hereinbefore and hereinafter in connection with the lens and in contrast to the effective aperture area of the same lens through which rays of light of interest are allowed to pass is to be understood as including one or both of the beveled peripheral surface B and the annular marginal surface C for the purpose of the present invention.

Figure 3:
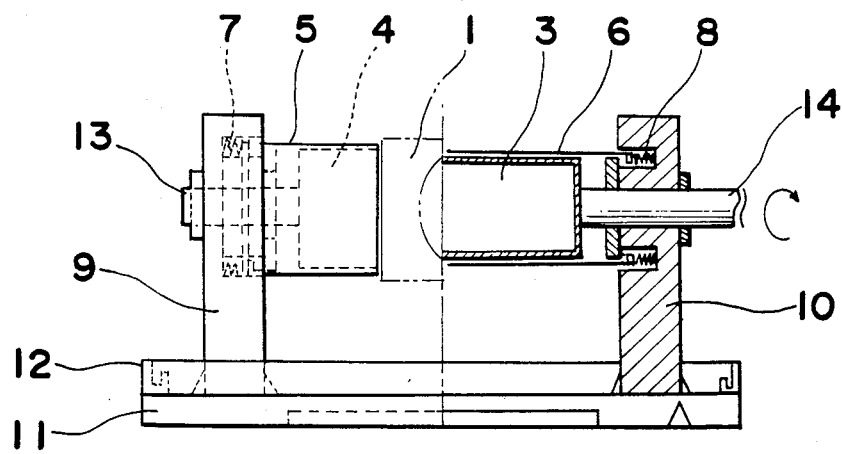
FIG. 3 is a schematic front elevational view, with one of the halves shown in section, of a lens support structure.

Referring now to FIG. 3, a lens support structure utilizeable in the practice of the coating method of the present invention is shown. The lens support structure comprises a pair of rotatably supported, coaxially aligned cylindrical hollow chucks 3 and 4, and shafts 14 and 13 rigidly connected at one end to the respective chucks 3 and 4 for rotation together therewith and rotatably supported by respective stands 10 and 9 in coaxial relation with each other with the chucks 3 and 4 positioned between these stands 10 and 9. The lens support structure is mounted on a pallet 11 which is in turn mounted on a transporting conveyor (not shown) for the transportation from one processing station to another.

The lens 1 is supported between the chucks 3 and 4 with the confronting annular ends of the respective chucks sandwiching the lens therebetween in contact with the opposite faces of the lens coaxially of the optical axis thereof. Each of the chucks 3 and 4 made of aluminum has a wall thickness of 1 mm and also has the annular end covered with chloroprene rubber for avoiding any possible formation of scratches on the lens when it contacts the lens face. Since the annular end of the chuck 3, when the lens 1 is supported between the chucks 3 and 4, contacts the lens face externally of the concavity defined therein, the optical axis of the lens 1 is align exactly with the axis of rotation. Thus, it will readily be seen that the lens 1 can supported with each point on its periphery spaced an equal distance from a lamp 16 (FIGS. 4 and 5) and, therefore, the thickness of the light-shield coat formed in a manner as will be described can be rendered uniform.

The shaft 14 has its free end remote from the associated chuck 3 adapted to be drivingly connected with a drive motor 19 (FIGS. 4 and 5) through a releaseable coupling 18.

The lens support structure also comprises cylindrical hoods 5 and 6 carried by the respective stands 9 and 10 so as to enclose the chucks 4 and 3 therein and preferably made of Teflon. These hoods 5 and 6 are biased in a direction towards each other by the action of respective springs 7 and 8 so that the confronting ends of the respective hoods 7 and 8 can, when and so long as the lens 1 is supported between the chucks, contact the opposite lens faces radially outwardly of the confronting annular ends of the associated chucks 4 and 3. These hoods 5 and 6 serve to prevent particles of the UV-setting masking paint being applied from smearing the effective aperture area of the lens, i.e., portions of the respective lens faces radially inwardly of the associated chucks 4 and 3.

Figure 4:
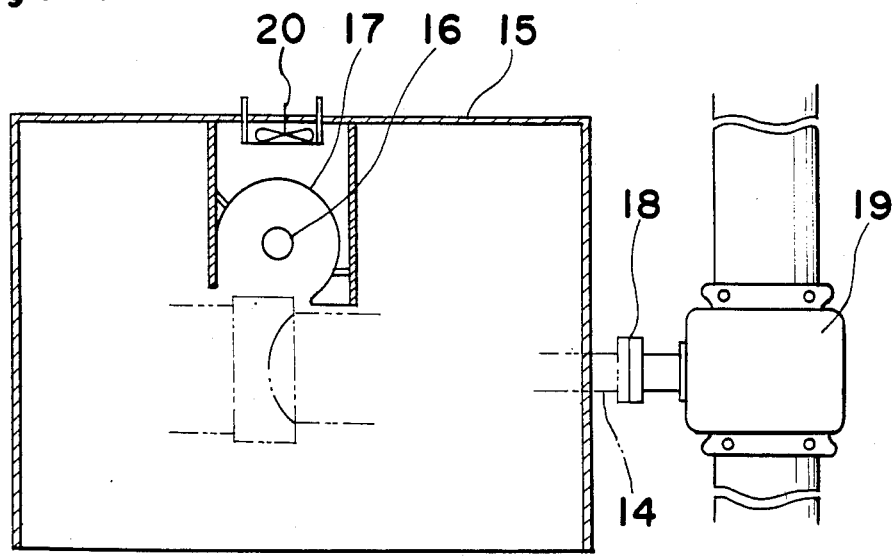
FIG. 4 is a schematic sectional view showing a UV radiating chamber.

Referring to FIG. 4, a UV-radiating chamber shown therein is defined by a open bottomed lamp housing 15 having therein a UV-radiating lamp 16 surrounded by a reflective shade 17 and adapted to be cooled by a motor-driven fan 20. The drive motor 19 for rotating the chuck 3 and, hence, the lens 1 shown by the imaginary line in FIG. 4 is positioned exteriorly of the lamp housing 15. The lamp 16 is preferably an ultrahigh voltage mercury lamp provided with a heat insulating blue filter to avoid the heating of the lens 1, which mercury lamp is manufactured and sold by K.K. Oak Mfg. of Japan.

Figure 5:
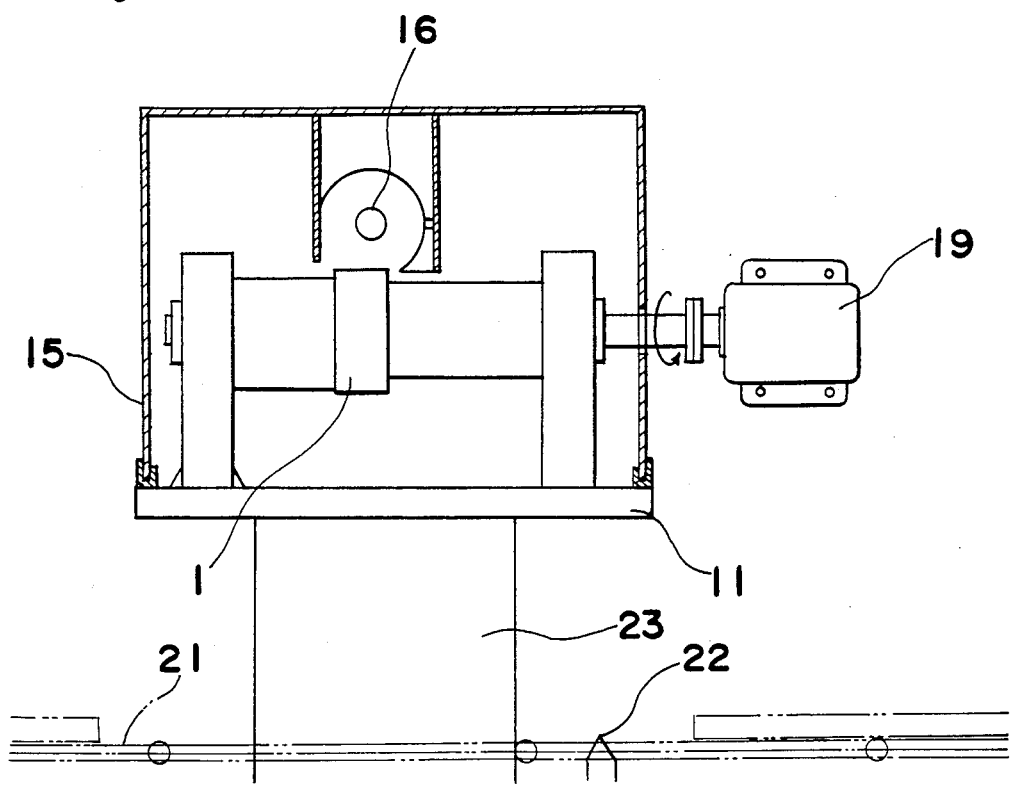
FIG. 5 is a schematic sectional view of a coating apparatus used in the practice of the coating method according to the present invention.

FIG. 5 illustrates the condition wherein the pallet 11 shown in FIG. 3 has been transported by the conveyor 21 to a predetermined position 22 and has been subsequently elevated by a piston 23 to position the lens 1 in the vicinity of the lamp 16 for hardening the paint applied on the peripheral area of such lens 1. When the pallet 11 is elevated as shown, the peripheral edge of the lamp housing 15 defining the bottom opening thereof is received in a generally U-sectioned or J-sectioned edge member 12 provided on the pallet 11 for avoiding any possible leak of UV rays exteriorly of the lamp housing 15. The UV-radiating chamber of the construction described as hereinabove described is so designed that, while the pallet 11 is in the elevated position and the lens 1 is rotated at 50 to 700 rpm by the rotation of the drive motor 19, the paint applied on the peripheral area, particularly both the beveled peripheral surface B and the annular marginal surface C, of the lens can be uniformly hardened by the radiation of UV rays from the lamp 16.

The UV-setting masking paint used in the practice of the method of the present invention is preferably of a composition consisting of 1 to 20 wt % of at least one polyester polyacrylate, at least one acrylate monomer, 1 to 7 wt % of light shielding filler material such as, for example, talc, and 1 to 10 wt % of light sensitizer capable of hardening when exposed to UV rays. Where the thickness of the resultant light shield coat 2 increases, the light scattering agent is important.

Figure 6:
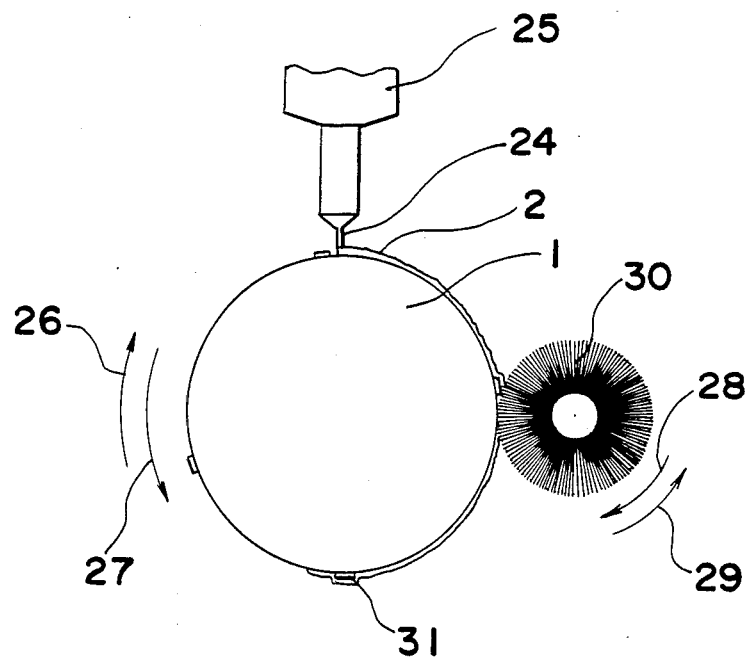
FIG. 6(a) is a schematic diagram showing the manner by which the peripheral area of the lens is painted with a paint.
FIGS. 6(b) and 6(c) are diagrams showing generally roll-shaped brushes used in the practice of the method of the present invention.
Figure 6:
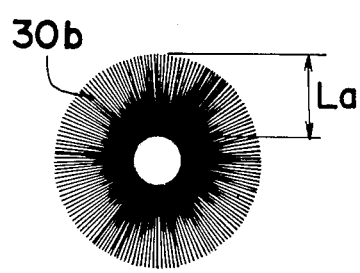
Figure 6:
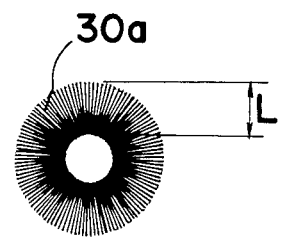

The application of the UV-setting masking paint to the peripheral area of the lens 1 will now be described with particular reference to FIG. 6. As shown in FIG. 6(a), while the lens 1 supported between the chucks 3 and 4 was rotated in one direction shown by the arrow 26 at 8 rpm, the UV-setting masking paint was applied from a nozzle 24 of a dispenser 25 onto the peripheral area of the lens 1. At the same time, a generally rolled-shaped first brush 30a, shown in FIG. 6(c), having wool bristles of 15 mm in length L coupled to a rotation control motor and rotated at 80 rpm in one direction shown by the arrow 28 was pressed against the peripheral area of the lens 1 being rotated to spread the applied paint so as to form a multiple of irregular indentations on the outer surface of the ply of the applied paint. Thereafter, the ply of the applied paint was hardened and dried to complete the first ply of the masking paint. The presence of the irregular indentations on the outer surface of the first ply serves to improve the bondability of a subsequently formed second ply of the masking paint to the first ply.

After the masking paint had subsequently been applied by the use of the dispenser 25 onto the outer surface of the first ply, a generally roll-shaped second brush 30b, shown in FIG. 6(b), having wool bristles of 25 mm in length La was, while being rotated at 80 rpm, pressed against the lens to spread the applied paint over the first ply so as to form a multiple of irregular indentations, smaller than those on the first ply, on the outer surface of the second ply of the paint. Thereafter, the second ply was hardened and dried to complete it. By so doing, the resultant light shield coat of a thickness varying within a tolerance of ±10 micrometers could be obtained. In particular, during the formation of the first ply, since gates 31 project about 2 mm from the periphery of the lens, the lens 1 was temporarily rotated in the opposite direction shown by the arrow 27 to avoid some or all of those portions of the lens, where the gates project radially outwardly, being left uncoated.

In the practice of the method of the present invention, the lens and the brush or brushes are rotated preferably in different directions shown by the respective arrows 26 and 28. A combination of the directions of rotation of the lens and the brush or brushes shown by the respective arrows 27 and 28 results in an undesirable surface condition of the resultant coat and is, therefore, utilized only when those portions of the peripheral area of the lens left uncoated are to be removed. The other combination of the directions of rotation of the lens and brush or brushes shown by the arrows 27 and 29 and by the arrows 26 and 29, respectively, bring about not only the undesirable surface condition of the resultant coat, but also the undesirable localized scraping of the resultant coat from the lens by the action of the brush or brushes and are, therefore, undesirable.

During a series of experiments conducted, the coating was carried out under the following conditions. The dispenser 25 employed was the one manufactured and sold by Ace Giken Co., Ltd. of Japan under a trade name "Balpet BP-1050". The dispenser nozzle 24 used was a syringe needle, 0.9 or 1.2 mm in outer diameter, manufactured and sold by Telmo Corporation of Japan. The UV-setting masking paint used was a UV-setting ink jointly developed by Nagase Screen Printing Research Co., Ltd. of Japan and the assignee of the present invention and identified by "UV INK, A-1-RS, DM-3 Black-2EA" (Viscosity: 22.5 poises at 25° C.). Actually, any one of the UV inks manufactured and sold by Nagase Screen Printing Research Co., Ltd. and identified respectively by "A-1-RS, DM-3-2" (Viscosity: 38 poises) and "DM-3-2A" (Viscosity: 30 poises) can also be used in the practice of the method of the present invention.

The UV-setting masking paint was applied over the peripheral area of the lens so that 0.30 g, 0.15 g and 0.25 g of the paint could be circumferentially deposited on one part Ba of the confronting faces of the beveled surface B, the other part Bb of the confronting faces of the beveled surface B, and the marginal surface C, respectively. After the circumferentially applied deposits of the paint were uniformly layered by the use of the roll-shaped brush 30, the paint was hardened and dried in the UV-radiating chamber shown in FIG. 4. The roll-shaped brush 30 used was the brush 30a having the bristles of 15 mm in length L and 40 mm in width for the formation of the first ply, and the brush 30b having the bristles of 25 mm in length La and 40 mm in width for the formation of the second ply. In any event, it appears that the brushes satisfying the relationship of La≧L are satisfactory. For the hardening of the applied paint, an ultrahigh voltage mercury lamp manufactured and sold by K.K. Oak Mfg. of Japan under a trade name "Model CHM-2000" was employed for the UV-radiating lamp 16. UV-rays from the lamp 16 were radiated directly, or indirectly through the reflector shade 17, over the entire surface of the lens for 50 seconds and the lamp 16 was provided with a blue filter, manufactured and sold by K.K. Oak Mfg., for cutting off the short wavelengths. The intensity of the lamp 16 was adjusted to 300 W/cm, and the radiating distance from the lamp 16 to the lens was 40 to 110 mm.

The plastic lens made of acrylic resin could be successfully coated with the light-shield coat of a thickness within the range of 10 to 60 micrometers exhibiting an increased bonding strength to such an extent that the peel test showed that none of the 100 fragments of the light-shield coat formed by the method of the present invention peeled off when an adhesive sheet covering the 100 fragments was removed. Moreover, the physical and chemical properties of the light-shield coat so formed did not change when allowed to stand for 500 hours in an atmosphere of 40° C. at 90% relative humidity. It is, however, to be noted that the light-shield coat of a thickness greater than 20 micrometers can be obtained when the paint is applied in a number of plies.

Thus, it has now become clear that the method of the present invention is effective to form the light-shield coat on the peripheral area of the lens within a minimized time and without the paint smearing the effective aperture area thereof.

Although the present invention has fully been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of forming a light-shield coating on the peripheral area of an optical lens comprising holding the optical lens between two spaced opposed chucks for rotation around the optical axis of the optical lens, dropping a quantity of ultra-violet-setting black colored paint sufficient to cover the peripheral area of the optical lens to a desired thickness on the peripheral area of the optical lens while rotating the lens, bringing the periphery of a rotating first roll-shaped brush having radially extending relatively stiff bristles into contact with the peripheral area of the optical lens for spreading the paint into a paint layer of substantially uniform thickness and having indentations therein from the bristles of the brush, irradiating the thus formed paint layer with untra-violet light to harden the paint, repeating the dropping step, bringing the periphery of a second rotating roll-shaped brush having radially extending relatively flexible bristles into contact with the peripheral area of the optical lens for spreading paint into a relatively smooth substantially uniform thickness additional paint layer, and irradiating the thus formed additional paint layer with ultra-violet light to harden the additional paint layer.

2. The method as claimed in claim 1 in which the first brush has short bristles and the second brush has long bristles.

3. The method as claimed in claim 1 in which the first brush has hard bristles and the second brush has long bristles.

4. The method as claimed in claim 1 in which the first brush has short bristles and the second brush has soft bristles.

5. The method as claimed in claim 1 in which the first brush has hard bristles and the second brush has soft bristles.

6. A method as claimed in claim 1 wherein the step of rotating the lens comprises applying the end edges of two spaced opposed hollow cylindrical chucks against the radial faces of said optical lens for holding the optical lens therebetween, said end edges lying outside the areas of the radial faces through which light is to pass.

* * * * *